United States Patent [19]

Strzalka

[11] 4,413,414
[45] Nov. 8, 1983

[54] HAND HELD PORTABLE BAND SAW

[76] Inventor: Marion W. Strzalka, 230 E. Foxbury, Pomona, Calif. 91767

[21] Appl. No.: 379,069

[22] Filed: May 17, 1982

Related U.S. Application Data

[63] Continuation-in-part of Ser. No. 172,658, Jul. 28, 1980, abandoned.

[51] Int. Cl.³ .............................................. B27B 13/08
[52] U.S. Cl. ....................................... 30/380; 83/521; 83/817
[58] Field of Search ......................... 30/371, 373, 380; 83/816, 818, 820, 817, 521; 51/135 BT

[56] References Cited

U.S. PATENT DOCUMENTS

| | | | |
|---|---|---|---|
| 2,625,964 | 1/1953 | Green | 30/380 |
| 2,876,809 | 3/1959 | Retsch | 30/380 |
| 2,903,027 | 9/1959 | Edgemond | 83/817 |
| 3,656,391 | 4/1972 | Von Arx | 83/521 |
| 3,658,102 | 4/1972 | Joosten | 30/380 |
| 3,829,970 | 8/1974 | Anderson | 30/380 |
| 4,001,937 | 1/1977 | Stelljes | 30/380 |
| 4,172,402 | 10/1979 | Hayward | 83/817 |

Primary Examiner—Jimmy C. Peters
Attorney, Agent, or Firm—Boniard I. Brown

[57] ABSTRACT

A band saw or scroller is provided which includes a housing with confronting spaced portions and apparatus for carrying a plurality of rollers for supporting a closed loop band saw blade for travel of the blade in a closed loop path with a portion of the blade extending between the spaced housing portions. Apparatus is provided for driving the carrying means to drive the blade. Apparatus is provided for adjustment of blade tension by the adjustment of the position of one of the rollers by varying the orientation of the roller shaft axis, the adjustment apparatus including an adjustably rotated mounted member, and means eccentrically positioned on the rotatable member to support an end of the roller shaft, so that adjustment of the rotational position of the rotatable member adjusts the roller shaft orientation to vary the position of the roller periphery.

6 Claims, 9 Drawing Figures

HAND HELD PORTABLE BAND SAW

RELATED APPLICATIONS

This application is a continuation-in-part of application Ser. No. 172,658 filed on July 28, 1980, now abandoned.

BACKGROUND OF THE INVENTION

The invention relates to power driven sawing apparatus and particularly to such apparatus which is intended to be moved relative to a stationary workpiece to perform a cutting operation. The invention has particular application to band saw or scroller apparatus having a loop shaped cutting blade. The prior art includes stationary band saws which are intended to be used to cut a workpiece which is moved relative to the saw. Such apparatus is relatively expensive and bulky. The bulk is of particular significance in storing the apparatus. In many applications the size of the workpiece may also be very large and it may be impractical to move the workpiece relative to the cutting saw.

Accordingly it is a primary object of the invention to provide an apparatus which is both inexpensive and compact.

Still another object of the invention is to provide apparatus which will enable precise movement of the cutting apparatus to form complex geometric forms.

Still another object of the invention is to provide apparatus which will facilitate cutting of very large workpieces which could not readily be moved relative to a stationary band saw to produce a desired geometric form.

Yet another object of the invention is to provide apparatus which will provide the operator thereof with excellent visibility of the area in which cutting of the workpiece is being performed.

SUMMARY OF THE INVENTION

The foregoing objects and other objects and advantages which shall become apparent from the detailed description of the preferred embodiment are attained in a band saw which includes a housing with confronting spaced portions, means on the housing for carrying a plurality of rollers to support a closed loop band saw blade for travel of the blade in a closed loop path with a portion of the blade extending between the spaced housing portion, and driving means to operate the carrying means to drive the band saw blade. Means are provided for adjusting blade tension by adjustment of the position of one of the rollers by varying the orientation of the roller shaft, and such adjustment means may preferably include means eccentrically positioned on the rotatable member to support an end of the shaft, adjustment of the rotational position of the rotatable member adjusting the roller shaft orientation to vary the position of the roller periphery.

The means for carrying may comprise a plurality of rollers. Each of the rollers may have a crowned surface disposed substantially at the axial midsection thereof.

The apparatus may further include means for facilitating visual inspection of the axial section of the blade intermediate the axial extremities of the generally U-shaped housing. The means for facilitating may include at least one mirrored surface. The mirrored surface may be disposed proximate to one axial extremity of the generally U-shaped housing.

The plurality of rollers may consist of four rollers.

DESCRIPTION OF THE PREFERRED EMBODIMENT

Figure 1:
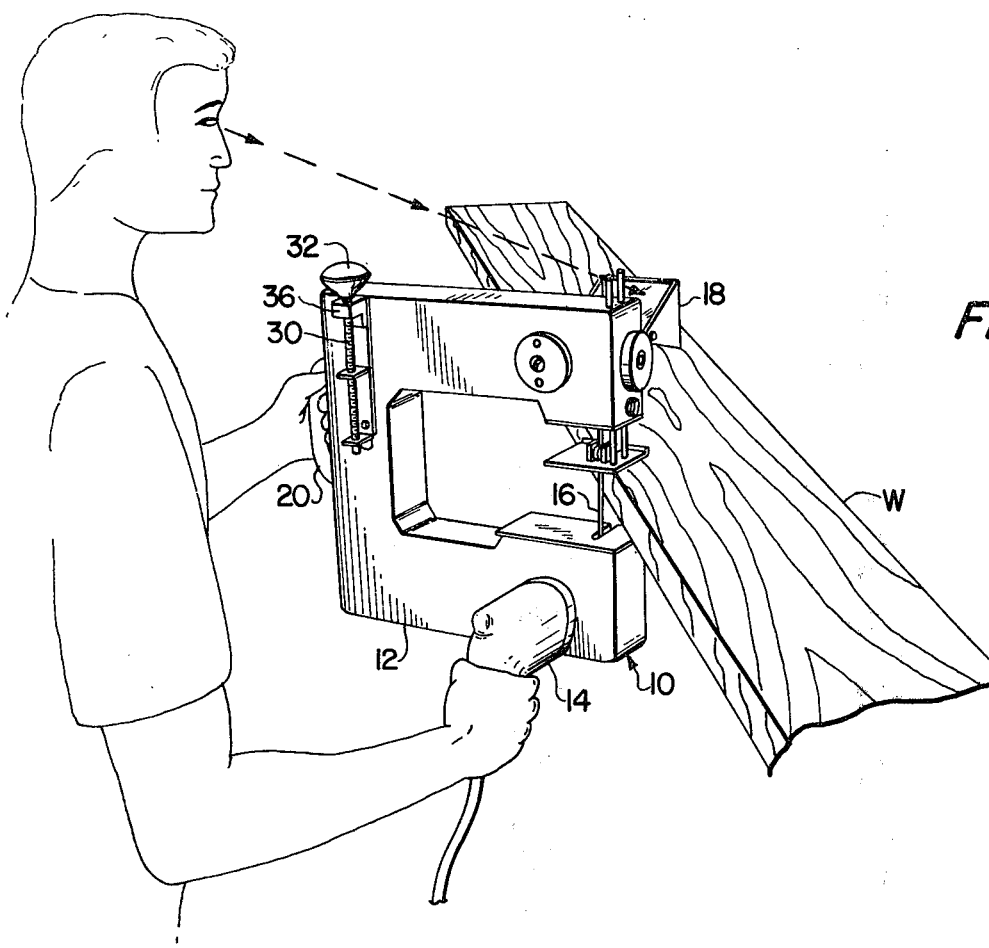
FIG. 1 is a perspective view of the apparatus in accordance with one form of the invention.
Figure 2:
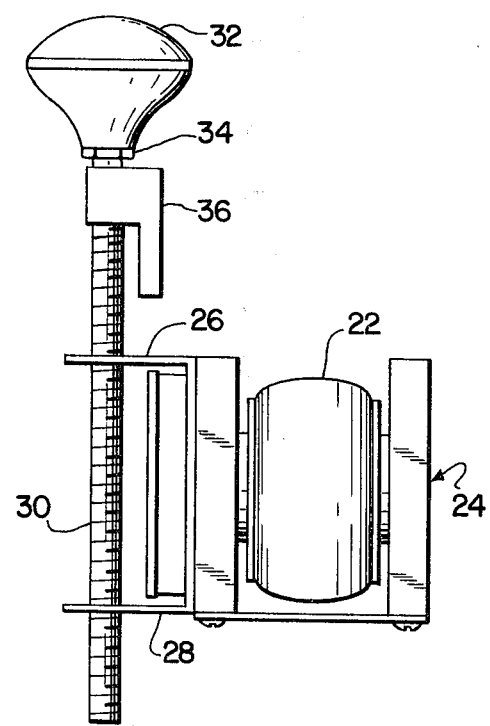
FIG. 2 is an elevational view of a portion of the apparatus shown in FIG. 1.
Figure 3:
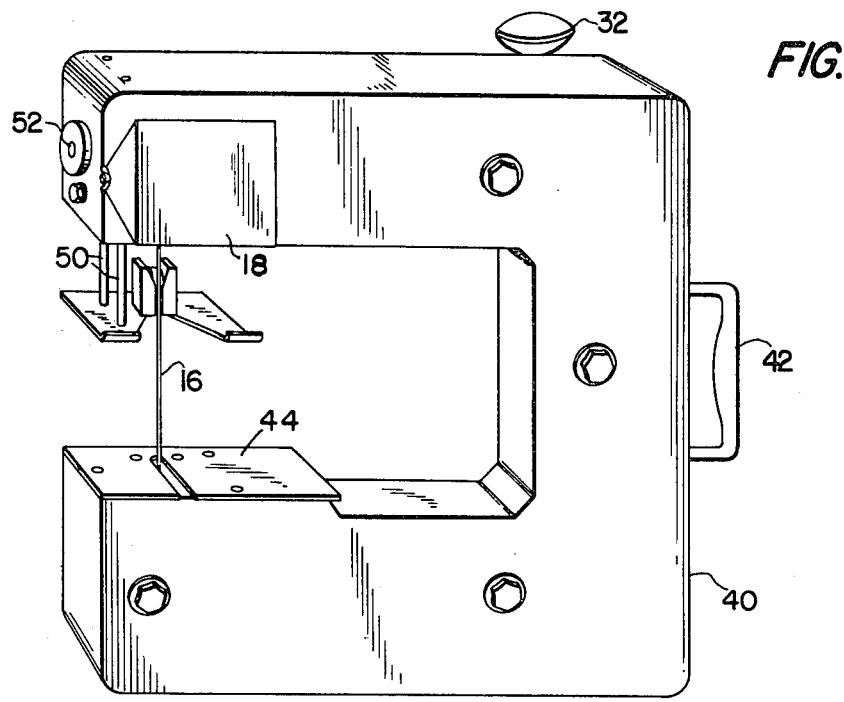
FIG. 3 is a perspective view of a second embodiment of the apparatus in accordance with the invention which is generally similar to the apparatus shown in FIG. 1.
Figure 4:
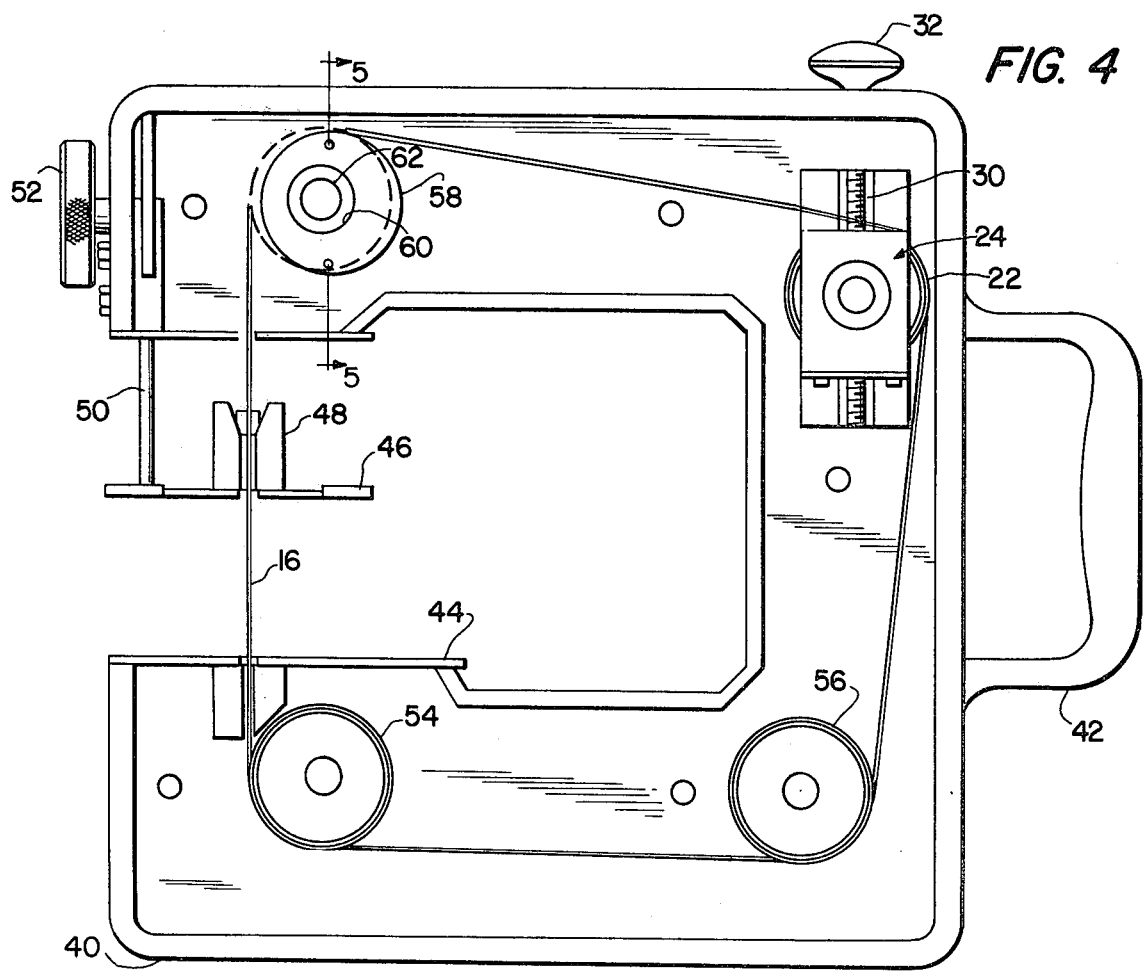
FIG. 4 is an elevational view of the apparatus shown in FIG. 3 with a side cover removed.

Referring now to FIGS. 1 and 2 there is shown a band saw 10 which is being used by an operator to make a cut in a workpiece W. A housing 12 of the band saw 10 is generally U-shaped and has axial extremities which are disposed in spaced relationship. In the embodiment illustrated in FIG. 1, a power drill 14 is used with the band saw 10 to provide the necessary power. A band or loop saw blade 16 extends intermediate the axial extremities of the generally U-shaped housing 12. A mirror 18 is disposed adjacent to the upper axial extremity of the generally U-shaped housing 12 to enable the operator to better view the area in which cutting takes place, i.e. the interface between the band or loop saw blade 16 and the workpiece W. In the embodiment of FIG. 1 the generally U-shaped housing 12 is provided with a handle 20, and the operator is able to grasp, not only the handle 20, but also the handle of the power drill 14 to position the entire apparatus with respect to the workpiece W. The manner of carrying the band or loop saw blade 16 will be described in greater detail hereafter. It will be seen in FIGS. 1 and 2 that one roller 22 is carried on a bracket 24 which permits the roller 22 to turn freely with respect to the bracket 24. The bracket 24 includes arms 26, 28 which are threaded and cooperate with a lead screw 30 having a handle 32 which is fixed by a lock nut 34. A bracket 34 also engages the lead screw 30 and fixes the lead screw 30 with respect to the generally U-shaped housing 12.

The apparatus in accordance with the invention illustrated in FIGS. 3-9 is generally similar apparatus to that described above, differing primarily in the mounting of the band or loop saw blade 16 and the inclusion of an electric motor (not shown) as an integral part of the assembly. This differs from the embodiment of FIG. 1 which cooperates with the associated electric drill 14. A generally U-shaped housing 40 includes a handle 42. The assembly also includes the handle 32 which cooperates with the lead screw 30 which in turn carries the bracket 24 on which the roller 22 is disposed as in the embodiment in FIGS. 1 and 2. The band or loop saw blade 16, carried in part on the roller 22, extends intermediate the axial extremities of the generally U-shaped housing 40. The band or loop saw blade 16 passes through a lower slotted plate or plates 44 as well as through an upper adjustable shoe plate guide or shoe 46 which carries a blade guide 48. The upper adjustable shoe plate guide 46 is carried by rods 50, 50 which are selectively locked in place by means of a threaded locking member having a knurled locking nut 52.

The band or loop saw blade 16 is also carried by rollers 54, 56 which are mounted for rotatable movement about fixed axes which extend in generally normal relationship to the plane defined by the band or loop saw blade 16. Unlike the structure used in the prior art apparatus which may typically use two or three relatively large rollers or support wheels, the rollers in 54, 56 each embodiment of the present invention are relatively small. Smaller rollers involve more substantial problems relative to preventing the band or loop blade 16 from becoming disengaged from a roller by moving in a direction relatively axial of the roller, which problems are overcome by the invention.

Referring to FIGS. 5 to 9 of the drawings, a tensioning roller 58 is fixed on a roller shaft 62 the axis of which may be selectively varied in inclination or orientation relative to a plane defined by the band or loop blade 16. As hereinafter described, in accordance with the invention, adjustment of the orientation or inclination of the roller shaft axis provides adjustment of the roller position to tension or bias the band or loop saw blade 16 to insure that it does not loosen and become disengaged from rollers 58, 54, 56, 22.

Figure 6:
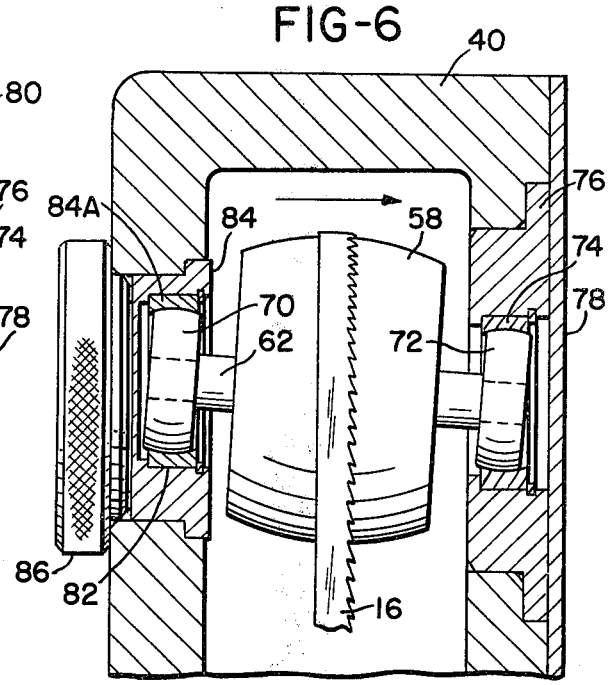
FIGS. 6 and 7 are views similar to FIG. 5 showing alternate positions which the adjusting elements may assume.
Figure 7:
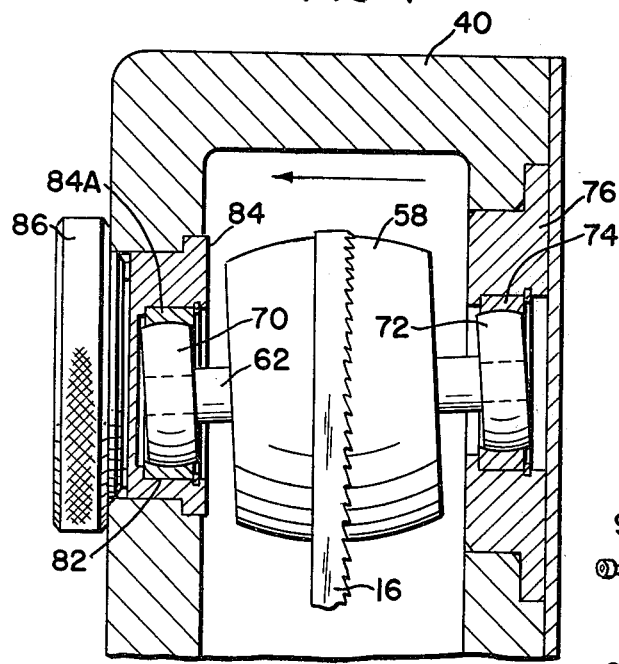
Figure 8:
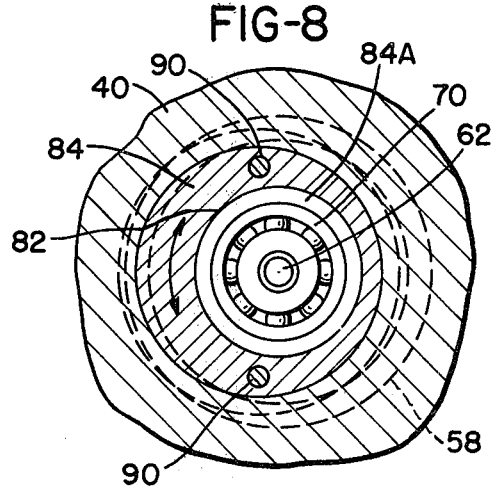
FIG. 8 is a fragmentary sectional view taken along line 8—8 of FIG. 5.
Figure 9:
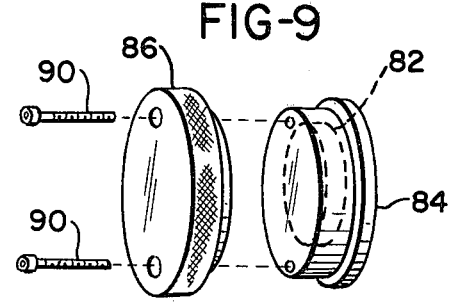
FIG. 9 is an exploded perspective view of a portion of the apparatus illustrated in FIGS. 5-8.

The roller shaft 62 is carried in self-aligning ball bearings 70, 72 which ordinarily minimize the inclination of the roller shaft 62. Bearings 72 at the right extremity of the roller shaft 62 (as viewed) are carried in an annular member 74 which is mounted in a housing portion or member 76. A plate 78 extends over the housing portion or member 76 and is secured by screws 80 to the generally U-shaped housing 40. As indicated in FIGS. 6 and 7, the outer race of the self-aligning bearings 72 and the annular members 74 have arcuate interengaging surfaces so that limited relative rotational movement is enabled, thus allowing the left end portion of the roller shaft 62 to be raised and lowered.

The left end portion of the roller shaft 62 is carried in the self-aligning bearings 70 which are mounted in a circular recess in an annular member 84A, which recess has its axis substantially eccentric to that of the annular member 84A. The annular member 84A is fixedly secured to an annular member 84, which is attached to knurled knob 86 by bolts 90, as shown. The annular member 84 and the knurled knob 86 have matching peripheral surfaces which fit in a circular opening of the generally U-shaped housing 40, as best shown in FIGS. 5, 6 and 7.

With the bolts 90 tightened, the annular member 84 and the knurled knob 86 are clamped or secured together in abutting relationship, with cooperating surfaces of the generally U-shaped housing 40, and are thus secured in rotational position.

To adjust the tension of the band or loop blade saw 16 by changing the orientation of the roller shaft 62 and raising or lowering its left end portion, the bolts 90, 90 are loosened, and the knurled knob 86 is rotated to rotate therewith the annular member 84 thereby changing the rotational position of an eccentric recess 82 to raise or lower the bearing and left end portion of the roller shaft 62. FIG. 5 illustrates a position of the eccentric recess 82 wherein the roller shaft 62 is oriented in substantially normal relationship to a plane defined by the band or loop saw blade 16.

Figure 5:
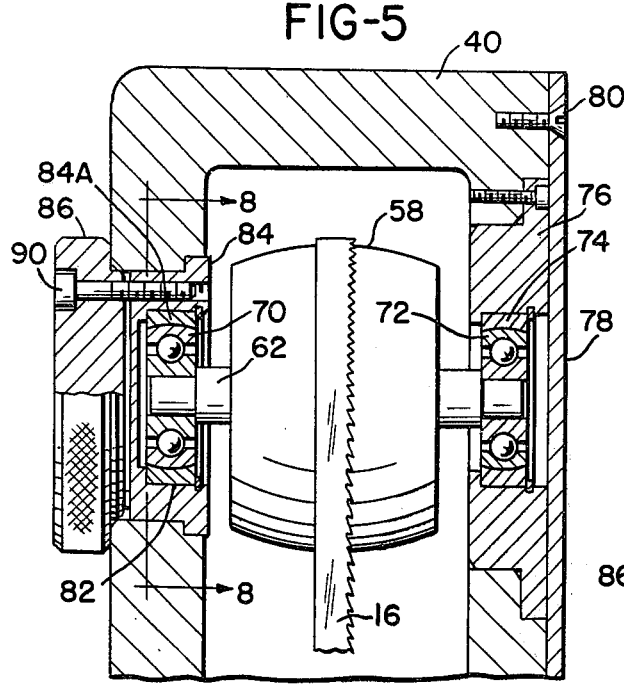
FIG. 5 is a sectional view taken at line 5—5 in FIG. 4.

FIG. 6 illustrates the position and orientation of the roller shaft 62 after the annular member 84 has been rotated by the knurled knob 86 to position the eccentric recess 82 and the bearing to raise the end portion of the roller shaft 62 to a higher elevation than that of FIG. 5.

FIG. 7 illustrates the position of the roller shaft 62 after rotation of the knurled knob 86 and the annular member 84 to position the eccentric recess 82 at a lower elevation, thus lowering the left end portion of the roller shaft 62.

The variation or change of orientation of the axis of the roller shaft 62 may be described as a tipping of the roller axis. It will also be understood that, as is well known, with reasonable tension of the band or loop saw blade 16, the crown or crowning of a roller, such as the roller 58, serves to prevent the band or loop saw blade from becoming disengaged from the roller 58, and causes the band or loop saw blade 16 to center itself on the roller 58.

Although in each of the embodiments the housing 12 has been described as being generally U-shaped, it will be understood that slightly different geometric forms such as a generally G-shaped form would also function in a similar manner. Accordingly, the term "U-shaped" as used herein should be understood to comprehend such geometric variations. In those forms of the invention a separate hand drill may be utilized. A spindle (not shown) may be provided to facilitate the necessary cooperation.

Ordinarily each roller 22, 54, 56, 58 will have the axial midsection crowned so that it has a slightly larger outside diameter than the other axial portions thereof. An example of this contour is best shown in FIG. 2.

It has been found that the rollers 22, 54, 56 and 58 have a relatively long service life. It is believed that, in part, this results because there is only rolling frictional engagement with the band or loop saw blade 16. The rollers 22, 54, 56 and 58 may be manufactured of plastic or wood covered with rubber. The associated band or loop saw blade 16, in one form of the invention, has a thickness of 0.012 inch. Various forms of the invention may be battery operated. The battery may be rechargeable.

The apparatus in accordance with the invention provides considerable savings in labor and time required to complete many jobs since the workpiece W may be cut "on site" instead of having to take the workpiece W to a stationary band saw located elsewhere. The apparatus is particularly adapted for the homeowner or hobbyist although also being suitable for certain industrial applications. It is, of course, highly economical to use conventional hand drill equipment. In addition to the other advantages recited above, the apparatus is also very compact.

The invention has been described with reference to its illustrated preferred embodiment. Persons skilled in the art of constructing power saws may, upon exposure to the teachings herein, conceive variations in the mechanical development of the components therein. Such variations are deemed to be encompassed by the disclosure, the invention being delimited only by the appended claims.

The inventor claims:
1. A band saw which comprises:
a generally U-shaped housing having confronting spaced end portions, means for carrying an associated closed loop shaped saw blade, said carrying means being on said housing and supporting the blade with a blade portion extending between said housing end portions and with the blade supported for travel in a closed loop path, said means for carrying including a plurality of rollers, each roller being mounted on a respective shaft, means for driving the blade on said means for carrying, means for adjusting blade tension by varying the angular orientation of the axis of at least one of said rollers relative to a plane extending through the axial extent of the band saw blade, said means for varying comprising a rotatably mounted cylinder and a cylindrical recess in the cylinder, said recess being disposed in generally eccentric relationship to said cylinder, and said means for adjusting includes bearing means at axially spaced points on said shaft mounting said one roller, each bearing means comprising a ball bearing and an annular member disposed between said rotatably mounted member and an outer race of the ball bearing, the outer race and rotatably mounted member having mutually engaging arcuate surfaces to effect self-alignment of the bearing and accommodate variation in orientation of said axis of said one roller.

2. The apparatus as described in claim 1, wherein:
certain of said rollers have a crowned surface disposed substantially at the axial midsection thereof.

3. The apparatus as described in 1 or 5, wherein: said apparatus further includes means for facilitating visual inspection of the axial section of the blade intermediate the end portions of the generally U-shaped housing, said means for facilitating including at least one mirrored surface.

4. The apparatus as described in claim 3, wherein:
said mirrored surface is disposed proximate to one end portion of said generally U-shape housing.

5. A band saw which comprises:
a generally U-shaped housing having confronting spaced end portions, means for carrying a closed loop saw blade, said means for carrying the blade with a portion extending between said housing end portions and supporting the blade for travel in a closed loop path, said means for carrying comprising a plurality of rollers, each of said rollers having a crowned axial midsection, and being mounted on a respective shaft having end portions bearingly carried on said housing, means for driving the blade on said means for carrying, and means for tensioning the blade by varying the orientation of the axis of at least one of the rollers to shift the position of its crowned axial midsection transversely of its shaft, which means comprises a rotatably mounted cylinder having a cylindrical recess therewithin disposed in generally eccentric relationship with the cylinder.

6. The apparatus as described in claim 1 or 5, wherein:
said plurality of rollers consists of four rollers.

* * * * *